(12) United States Patent
Cartwright et al.

(10) Patent No.: US 7,991,634 B2
(45) Date of Patent: Aug. 2, 2011

(54) VEHICLE TRANSPORT LOAD OPTIMIZATION

(75) Inventors: Matthew Cartwright, Austin, TX (US); Jonathan Lange, Katy, TX (US)

(73) Assignee: United Road Services Inc., Romulus, MI (US)

( * ) Notice: Subject to any disclaimer, the term of this patent is extended or adjusted under 35 U.S.C. 154(b) by 747 days.

(21) Appl. No.: 11/835,941

(22) Filed: Aug. 8, 2007

(65) Prior Publication Data
US 2008/0046302 A1 Feb. 21, 2008

Related U.S. Application Data

(60) Provisional application No. 60/821,799, filed on Aug. 8, 2006.

(51) Int. Cl.
G06Q 10/00 (2006.01)
G06Q 30/00 (2006.01)

(52) U.S. Cl. .......... 705/7.13; 705/1.1; 705/330

(58) Field of Classification Search .......... 705/7.13, 705/1.1, 330
See application file for complete search history.

(56) References Cited

U.S. PATENT DOCUMENTS

| | | | | |
|---|---|---|---|---|
| 5,525,026 A * | 6/1996 | DeMonte et al. | | 414/542 |
| 6,374,178 B2 * | 4/2002 | Nakagawa et al. | | 701/202 |
| 6,615,104 B2 * | 9/2003 | England et al. | | 700/213 |
| 6,721,762 B1 * | 4/2004 | Levine et al. | | 1/1 |
| 7,660,732 B2 * | 2/2010 | Malitski et al. | | 705/8 |
| 2002/0019759 A1 * | 2/2002 | Arunapuram et al. | | 705/7 |
| 2003/0050819 A1 * | 3/2003 | Koenigbauer et al. | | 705/8 |
| 2003/0200111 A1 * | 10/2003 | Damji | | 705/1 |
| 2004/0054554 A1 * | 3/2004 | Barts et al. | | 705/1 |
| 2004/0107110 A1 * | 6/2004 | Gottlieb et al. | | 705/1 |
| 2005/0197876 A1 * | 9/2005 | Benda et al. | | 705/7 |
| 2006/0010017 A1 * | 1/2006 | Hase et al. | | 705/7 |
| 2006/0020498 A1 * | 1/2006 | Aitipamula et al. | | 705/7 |
| 2008/0208401 A1 * | 8/2008 | Kumar et al. | | 701/19 |

OTHER PUBLICATIONS

"Honda chooses Avenitt for North America", Oct. 8, 1998, Purchasing, pp. 59.*
"CAT-WWL Sets Strategy for South Africa Auto Logistics", May 17, 2006, Journal of Commerce, pp. 1.*

* cited by examiner

Primary Examiner — Fadey S Jabr
(74) Attorney, Agent, or Firm — Foley & Lardner LLP

(57) ABSTRACT

A system and method for optimizing a vehicle transport load includes receiving data regarding an inventory of vehicles and data regarding available transports, comparing and analyzing the data, and producing a best profile load. The method may include configuring parameters to further refine the best profile load, deleting and adding vehicles to the best profile load, and outputting the best profile load to a dispatch.

17 Claims, 9 Drawing Sheets

Inventory 10

| VIN 102 | Origin ZIP 104 | Destination Zip 106 | Destination Client Number 108 | Size 110 |
| Released Date 112 | Revenue 114 | Must Ship Flag 116 |

Fig. 2

| Transport (Range) | | Type-A | Type-B | Type-C | Type-D | Total |
|---|---|---|---|---|---|---|
| City (1-100) | Day | 0 | 0 | 0 | 0 | 0 |
| | Night | 0 | 0 | 0 | 0 | 0 |
| | Weekend | 0 | 0 | 0 | 0 | 0 |
| Mini (101-250) | Day | 0 | 0 | 0 | 0 | 0 |
| | Night | 0 | 0 | 0 | 0 | 0 |
| | Weekend | 0 | 0 | 0 | 0 | 0 |
| Turn (251-350) | Day | 0 | 0 | 0 | 0 | 0 |
| | Night | 0 | 0 | 0 | 0 | 0 |
| | Weekend | 0 | 0 | 0 | 0 | 0 |
| Line (> 350) | Day | 0 | 0 | 0 | 0 | 0 |
| | Night | 0 | 0 | 0 | 0 | 0 |
| | Weekend | 0 | 0 | 0 | 0 | 0 |
| Any | Day | 0 | 0 | 0 | 0 | 0 |
| | Night | 0 | 0 | 0 | 0 | 0 |
| | Weekend | 0 | 0 | 0 | 0 | 0 |
| Total | | | | | | |

[Clear Parameters] [Save Parameters]

Load Parameters

Vehicle Load Time: 0 minutes
Vehicle Offload Time: 0 minutes
Daily Work Length: 0 hours

FIG. 6

UNITEDROAD LoadBuilder

- Inventory
- Transports
- Settings
- Best Fit Templates
- Optimize

Performance Goals

Load Efficiency: [<] [>] 0
Load Factors: [<] [>] 0
Skid Drops: [<] [>] 0
Revenue/Loaded Miles: [<] [>] 0

Days at Origin: [<] [>] 11

Mileage Requirements

Loaded Miles: [<] [>] 0
Revenue Miles: [<] [>] 0
Running Miles: [<] [>] 0

Save Settings

FIG. 8

Load Summary:

| Load ID | Origin Zip | Origin ID | Cars | Skids | Revenue | RPLM | Driving Miles | Revenue Miles | BestFit | Transp. | Trip |
|---|---|---|---|---|---|---|---|---|---|---|---|
| 2642 | 94510 | 559702 | 6 | 5 | 464.19 | 2.97 | 156.35 | 210.59 | 1*0*1*0*0 | A | mini |
| 2624 | 94510 | 559702 | 6 | 2 | 460.24 | 5.49 | 83.82 | 138.19 | 1*0*1*0*0 | A | city |
| 2635 | 94510 | 559702 | 7 | 1 | 382.62 | 76.52 | 5 | 146.24 | 1*0*1*0*0 | A | city |
| 2629 | 94510 | 559702 | 7 | 2 | 441.52 | 12.43 | 35.53 | 139.29 | 1*0*1*0*0 | A | city |
| 2637 | 94510 | 559702 | 7 | 2 | 497.64 | 5.88 | 84.7 | 208.93 | 1*0*1*0*0 | A | city |
| 2639 | 94510 | 559702 | 7 | 3 | 401.31 | 6.2 | 64.76 | 161.21 | 1*0*1*0*0 | A | city |
| 2640 | 94510 | 559702 | 7 | 2 | 448.16 | 20.66 | 21.7 | 185.59 | 1*0*1*0*0 | A | city |
| 2641 | 94510 | 559702 | 7 | 2 | 448.43 | 29.61 | 15.15 | 178.34 | 1*0*1*0*0 | A | city |
| 2636 | 94510 | 559702 | 7 | 2 | 386.12 | 25.96 | 14.87 | 149.3 | 1*0*1*0*0 | A | city |
| 2632 | 94510 | 559702 | 7 | 3 | 521.9 | 9.95 | 52.45 | 198.13 | 1*0*1*0*0 | A | city |
| 2633 | 94510 | 559702 | 7 | 2 | 413.38 | 9.54 | 43.32 | 160.85 | 1*0*1*0*0 | A | city |
| 2643 | 94510 | 559702 | 7 | 4 | 492.18 | 3.15 | 153.03 | 228.33 | 1*0*1*0*0 | A | city |

Details:

| Order | Origin Zip | Origin ID | Dest. Zip | Dest. ID | Release | VIN | Must Ship | Size | Make | Model | Price |
|---|---|---|---|---|---|---|---|---|---|---|---|
| 4876033 | 94510 | 559702 | 94804 | 563052 | 7/31/2007 | 1FMEU63E78UA07841 | N | 15 | Ford | Explorer | 54.66 |
| 4898217 | 94510 | 559702 | 94587 | 250730 | 7/28/2007 | 1FDNF20588EB99384 | N | 18 | Ford | Super Duty F-250 | 93.42 |
| 4898218 | 94510 | 559702 | 94587 | 250730 | 7/28/2007 | 1FDNF205X8EB99385 | N | 18 | Ford | Super Duty F-250 | 93.42 |
| 4890221 | 94510 | 559702 | 94587 | 250730 | 7/29/2007 | 1FDNF20518EB99386 | N | 18 | Ford | Super Duty F-250 | 93.42 |
| 5003511 | 94510 | 559702 | 94804 | 563052 | 7/27/2007 | 1FMCU49H98KA70059 | N | 14 | Ford | Escape | 54.66 |
| 5052500 | 94510 | 559702 | 94607 | 593205 | 8/1/2007 | 1F8SS31L770B40325 | N | 19 | Ford | Econoline Wag | 77.66 |
| 5052501 | 94510 | 559702 | 94607 | 593205 | 8/1/2007 | 1FTYR10D68PA11007 | N | 15 | Ford | Ranger | 54.66 |

FIG. 9

VEHICLE TRANSPORT LOAD OPTIMIZATION

CROSS REFERENCE TO RELATED APPLICATIONS

The present application claims priority to U.S. Provisional Patent Application No. 60/821,799 entitled "Vehicle Transport Load Optimization" filed Aug. 8, 2006. The contents of this provisional patent application are incorporated herein by reference in their entirety.

FIELD

The subject of the disclosure relates generally to systems and methods for organizing transportation operations. More specifically, the disclosure relates to the optimization of vehicle transport loads.

BACKGROUND

U.S. Pat. No. 7,243,074 describes a method for determining capacity utilization and predicting the future capacity utilization of a goods delivery system from a supplier to a buyer utilizing a system having at least one delivery agent, at least one store, at least one manufacturer, and a plurality of buyers, wherein the at least one delivery agent, at least one store, and the at least one manufacturer are coupled to a communications network. The method comprises the steps of searching for the available capacity in each one of a plurality of markets wherein each market has at least one delivery zone, calculating the capacity utilization by day for each zone, setting a flag which is indicative of over capacity or under capacity, determining the probability that the next day will be over capacity based on historical data, and determining the trend-line of capacity utilization based on historical data.

U.S. Patent Application Publication No. 20040107110 describes optimizing a total cost associated with transporting products on a set of vehicles. Orders representing products are assigned to one or more vehicles in the set. The assignment defines a sequence of pickup and delivery activities for the vehicles. One or more orders are deleted from one or more vehicles; at least one order from the deleted orders is inserted into a vehicle; the assignment is changed for at least one vehicle; and a cost is determined for the transportation of the products on the set of vehicles. The steps of deleting one or more orders, inserting at least one order, changing the assignment, and determining a cost are repeated until an optimal cost has been determined.

U.S. Patent Application Publication No. 20040225507 describes a method of managing the delivery of an order from at least one supplier to a respective delivery agent, and from the delivery agent to a respective buyer, given a requested order date and the respective buyers address, consisting of the steps including: determining a first potential arrival date of the order at a respective delivery agent's location based on the order request date and the buyer's address; calculating the capacity of the delivery agent to ship the order based the first potential arrive date request; and finally, determining when there is sufficient capacity to ship the order to the buyer's address.

U.S. Pat. No. 6,975,997 describes a system for sharing a fleet of vehicles among a plurality of users where, in preferred embodiments, the shared vehicles are electrically powered, the system comprising a system control computer that assigns vehicles in response to requests by users and monitors system performance, a computer subsystem through which users request vehicles for trips, and a vehicle subsystem within each vehicle that is in communication with the system control computer, allowing the system control computer to monitor the location and status of each vehicle in the vehicle sharing fleet.

U.S. Pat. No. 7,197,376 describes a mail processing system that delivers articles to delivery locations wherein a first transport vehicle at a first loading point is loaded with a first article and guided along a first delivery path to a first delivery location. A second transport vehicle at a second loading point is loaded with a second article and guided along a second delivery path to a second delivery location. Depending on a determination of whether the first and second transport vehicles deliver the first and second articles to the respective first and second delivery locations, the method returns an empty transport vehicle to the nearest one of the loading points and bypasses one of the first and second loading points for a still loaded transport vehicle. This allows minimization of the number of transport vehicles within the system.

U.S. Pat. No. 7,197,376 describes a method of scheduling a vehicle in real-time to transport freight and passengers. A host receives transportation requests (e.g., to deliver freight, transport passengers, reschedule, cancel, etc.) over a network from a freight terminal and/or a passenger terminal. A route is created at the host with destinations based on the received transportation requests. The host predicts an arrival time and a departure time for each destination along the route and generates a route schedule. As the vehicle travels to each destination, the host receives actual arrival and departure times and uses these actual times to update the route schedule. The route schedule is also updated when new destinations are added or a scheduled destination is cancelled. In another embodiment, the predicted arrival and departure times are updated based on vehicle positioning data received from a global positioning system. In each embodiment, the generated and updated route schedules are posted at the host and are accessible from any remote terminal over the network.

Prior systems and methods, including those described above, do not teach or suggest the optimization of vehicle transport loads, such as those in the exemplary embodiments described below.

SUMMARY

An exemplary method is directed towards optimizing a vehicle transport load for a plurality of transportation devices comprising importing data regarding an inventory of vehicles, importing data regarding transportation devices, and creating a best profile load that illustrates a preferred method of distributing the inventory on the transportation devices. The inventory of vehicles is distributed onto the transportation devices based on the data received regarding the inventory and the transportation devices. The method may provide feedback to a user based on the best profile load and may even provide a user interface configured to display the best profile load and metrics of the best profile load.

An exemplary method may further include determining the delivery distance for the inventory. Furthermore, the method may include modifying the best profile load by deleting or adding vehicles and by configuring prioritization parameters. The best profile load may also be outputted to a dispatch system.

An exemplary computer-readable medium includes programmed instructions which optimize vehicle load transports and include inputs of an inventory, inputs of a plurality of transportation devices, and a processor for producing a preferred method of distributing the inventory onto the transportation devices. The computer-readable medium may further include configurable parameters for refining the preferred method, displays for communicating the preferred method and its metrics to a user, and output means for communicating the preferred method to a dispatch system. Furthermore, the computer-readable medium may produce the preferred method by utilizing a pre-defined set of rules to compare the inventory to the transportation devices.

Furthermore, an exemplary system is directed toward producing an optimized vehicle transport load comprising an inventory of vehicles, a plurality of transportation devices, and a load optimizer with input and output means, wherein the load optimizer produces a preferred method of distributing the inventory onto the transportation devices. In addition, information about the inventory and transportation devices may be input into the load optimizer and the load optimizer may produce the preferred method by utilizing a pre-defined set of rules. Furthermore, the system may include displays for communicating the preferred method and its metrics to a user and the displays may even include graphical user interfaces. The system may also communicate the preferred method from the load optimizer to a dispatch system.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

FIG. 2 is a depiction of information obtained for inventory in the vehicle load optimization system of FIG. 1 in accordance with an exemplary embodiment.

FIG. 6 is a sample available transport user interface in a vehicle load optimization system in accordance with an exemplary embodiment.

FIG. 8 is a sample execute user interface in a vehicle load optimization system in accordance with an exemplary embodiment.

FIG. 9 is a sample solution set user interface in a vehicle load optimization system in accordance with an exemplary embodiment.

DETAILED DESCRIPTION

Figure 1:
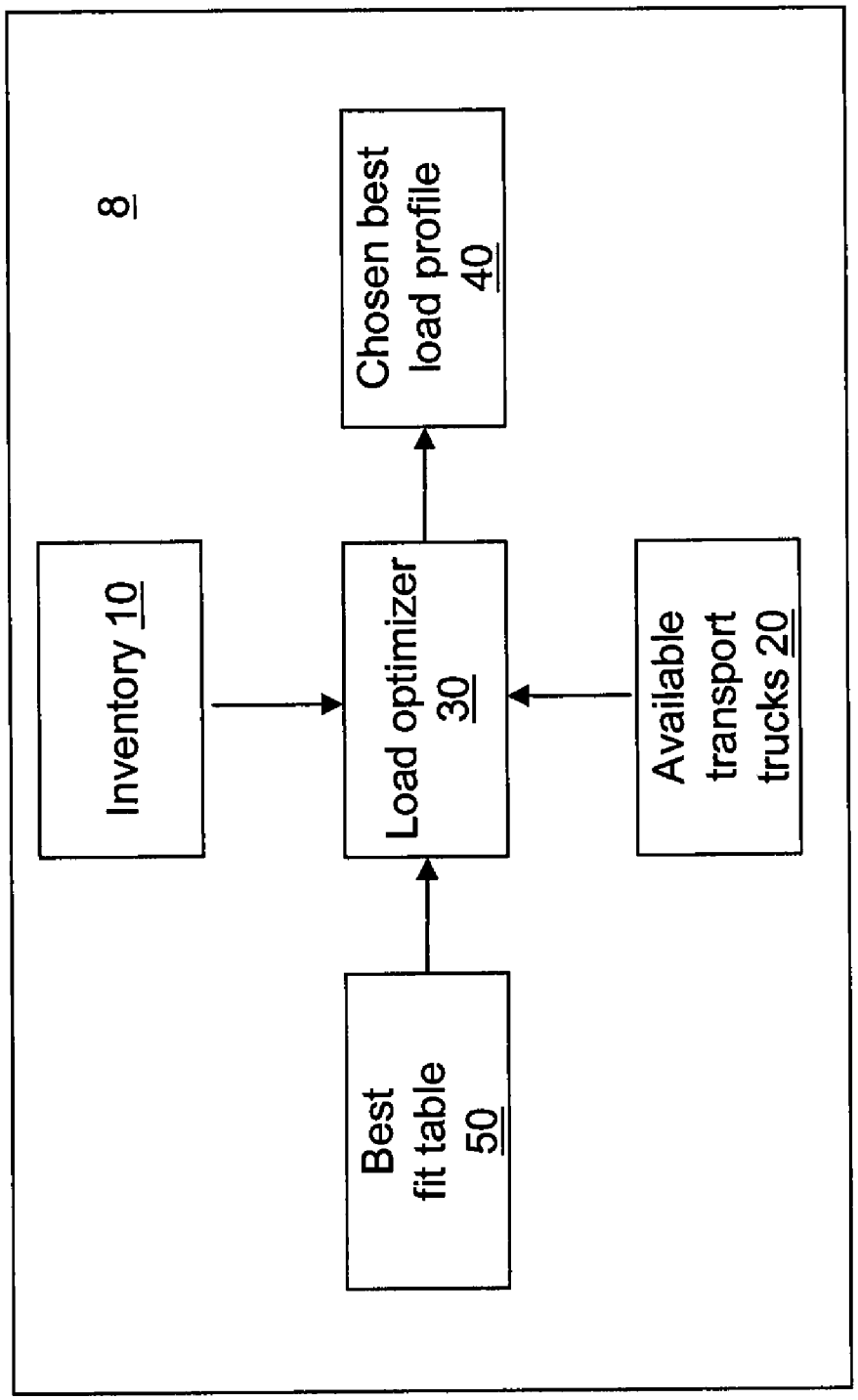
FIG. 1 is a general block diagram depicting a vehicle load optimization system in accordance with an exemplary embodiment.

Described herein are exemplary embodiments which optimize vehicle distribution via multi-car carriers. FIG. 1 illustrates a system 8 wherein the transportation of vehicles from an inventory 10 to each vehicle's individual destination is optimized, according to an exemplary embodiment. Information on the vehicles in inventory 10, available transport trucks 20, and a best fit table 50 are entered into a load optimizer 30. A plurality of best fit tables may be used. The load optimizer 30 determines the most efficient and profitable method of transporting the vehicles and outputs this transportation method as a chosen best load profile 40.

The inventory 10 includes all vehicles that are available for transportation. FIG. 2 illustrates exemplary information for each vehicle in the inventory 10 which is later imported into the load optimizer 30. A VIN 102 is a vehicle identification number which is unique to each vehicle and is used to identify the vehicle. An origin zip 104 represents the postal ZIP code where the vehicle is located prior to transport. A destination zip 106 represents the postal ZIP code of the destination where the vehicle is to be transported. A destination client number 108 represents the client to which the vehicle is to be transported. A size 110 represents the size of the vehicle. Vehicles may be classified into a plurality of sizes 110 as determined by the user. In an exemplary embodiment, vehicles are classified into five sizes 110. A released date 112 represents the date and time that the vehicle was entered into inventory. A revenue 114 represents the amount of money to be earned by the transportation of the vehicle to its destination. A must ship flag 116 represents whether or not the vehicle must be immediately shipped to its destination.

Figure 3:
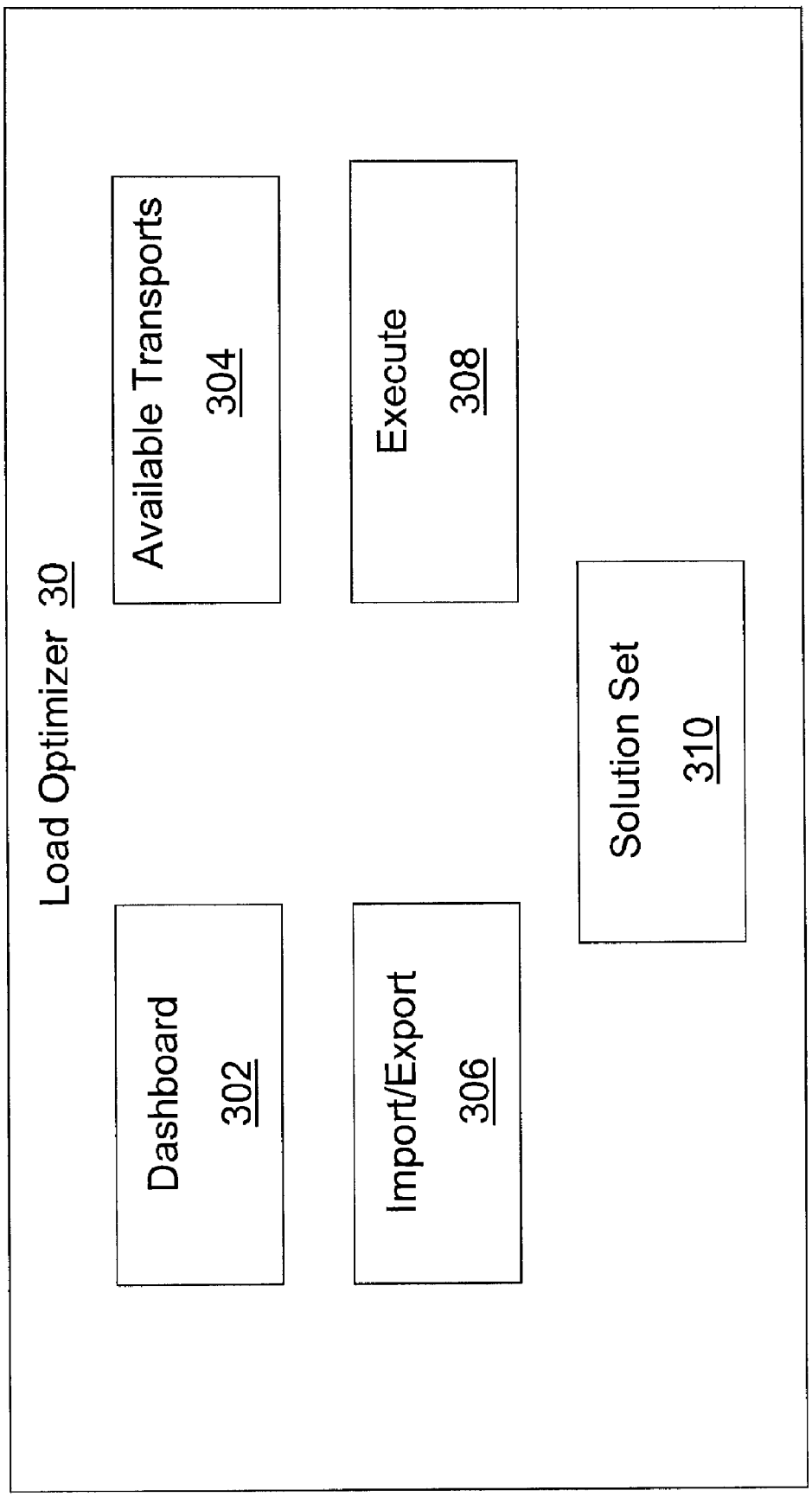
FIG. 3 is a diagram illustrating operational components of a vehicle load optimization system in accordance with an exemplary embodiment.

FIG. 3 illustrates an exemplary embodiment of the load optimizer 30 and its operational components. In an exemplary graphical user interface (GUI), these operational components are accessed by way of graphical tabs. In the exemplary embodiment, the GUI for the load optimizer 30 includes a dashboard tab 302, an available transport tab 304, an import/export tab 306, an execute tab 308, and a solution set tab 310. The dashboard tab 302 provides a graphical representation of the current load optimization solution based on specific parameters further described below.

The available transport tab 304 provides a user input mechanism to define the transport truck availability. The process of inputting the transport truck availability is further defined below.

Figure 7:
FIG. 7 is a sample import/export user interface in a vehicle load optimization system in accordance with an exemplary embodiment.

In an exemplary embodiment, the import/export tab 306 engages the load optimizer 30 to import required data including truck type definitions, best fit table 50, inventory, and order information and to export the generated load profile to an external application. The imported data will be further defined below. FIG. 7 depicts a screen shot of a GUI after the import/export tab has been chosen. The GUI in FIG. 7 allows the user to input parameters into a best fit table. Other embodiments of the import/export tab may include user definable inputs for inventory, truck type definitions, and order information.

The execute tab 308 allows the user to configure parameters of the load optimizer 30 to refine the optimization process. These configuration parameters are further defined below. The solution set tab 310 displays the results of the optimization process and is further defined below.

Figure 4:
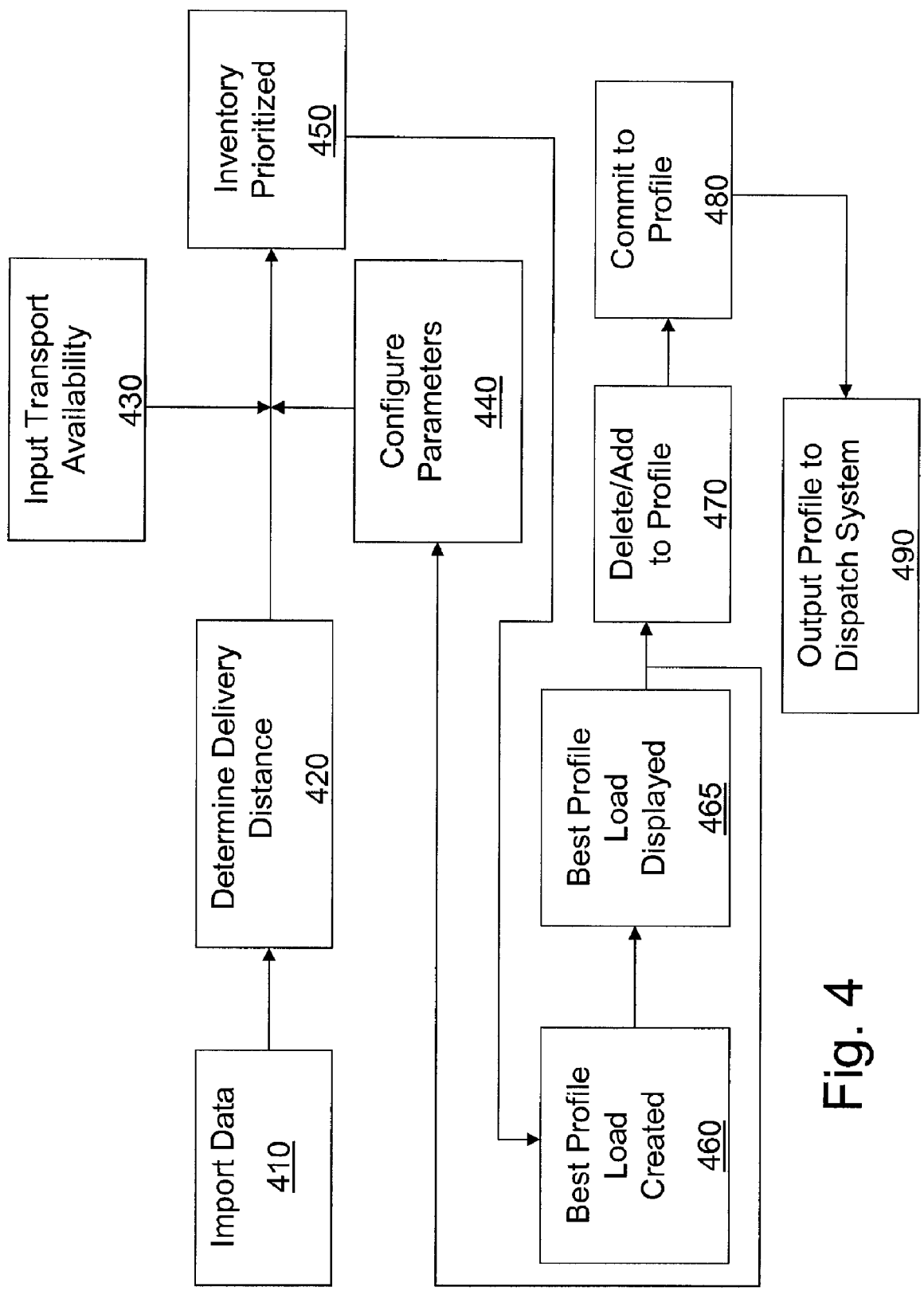
FIG. 4 is a flow diagram illustrating operations performed in a vehicle load optimization system in accordance with an exemplary embodiment.

FIG. 4 illustrates operations performed by the load optimizer 30 in accordance with an exemplary embodiment. Additional, fewer, or different operations may be performed depending on the particular implementation. Further, while a certain order or sequence in the operations is illustrated and described, alternative embodiments could have operations in a different order. In an operation 410, certain data is imported into the optimizer 30. This data may include the inventory 10, truck type definitions, and best fit table 50. The truck type definitions define the different types of transport trucks. Best fit table 50 defines how different combinations of vehicle sizes fit most efficiently on each type of transport truck. After the data is imported, the load optimizer 10 determines the delivery distance by comparing the destination zip 106 to the origin zip 104 in an operation 420.

The transport truck availability is input in an operation 430. FIG. 6 depicts a screen shot of a GUI presented upon selection of the transport truck availability tab. The GUI allows the number and types of available trucks to be inputted manually. The transport truck availability is further defined by both the load type and the delivery type of each transport truck. In an exemplary embodiment, transport trucks may be defined by one of four load types; city, mini, turn, and line. The city load type can be loaded, delivered, and returned in a single day. The mini load type can be loaded and delivered in a single day, but the return drive is completed in the following work period. The turn load type can be loaded, delivered, and returned in 2-3 work periods. The line load type is loaded, delivered, and returned in a period greater than 3 days. In an exemplary embodiment, transports trucks may also be defined by one of four delivery types. The day delivery type can be delivered between normal working hours. The night delivery time can only be delivered during off hours. The weekend delivery time can only be delivered on Saturday or Sunday. The all delivery time can be delivered at any time.

Prior to running the optimization, the user may also configure parameters of the load optimizer in an operation 440 by utilizing the execute tab 308. FIG. 8 depicts a screen shot of a GUI after the selection of the execute tab 308. The GUI allows the user to configure the allowable load efficiency threshold, load factor, skid drops, revenue per loaded mile, loaded miles, revenue miles, running miles, and days at origin. In addition, other embodiments may allow the user to choose inventory 10 from certain individual inventory origins or select multiple locations. The user may also configure the allowable must ship vehicles and transport trucks. The load efficiency threshold relates to the minimum number of vehicles on the load divided by the truck capacity. Skid drops relate to the number of different destination clients 108 on each load. The revenue per loaded mile on a load is determined based on the sum of the revenues 114 of the vehicles on the load divided by the total drive miles of the load. After modification of these parameters, the user may run the optimization.

Upon running the optimization, the inventory is prioritized based on parameters such as load distance, must ship vehicle statuses, release date vulnerability, same destination, and other destinations in an operation 450. The load optimizer 30 creates a best profile set of loads in an operation 460 based on the following four exemplary rules (additional, fewer, or different rules may be used depending on the particular embodiment): 1) Maximize the revenue per mile on the load; 2) Minimize the number of skid drops on the load; 3) Minimize the age of the remaining inventory that is not included in the best profile load; and 4) Maximize the number of vehicles on a best available transport truck in accordance with best fit table 50. The age of the remaining inventory is determined from the released dates 112 of the vehicles.

Figure 5:
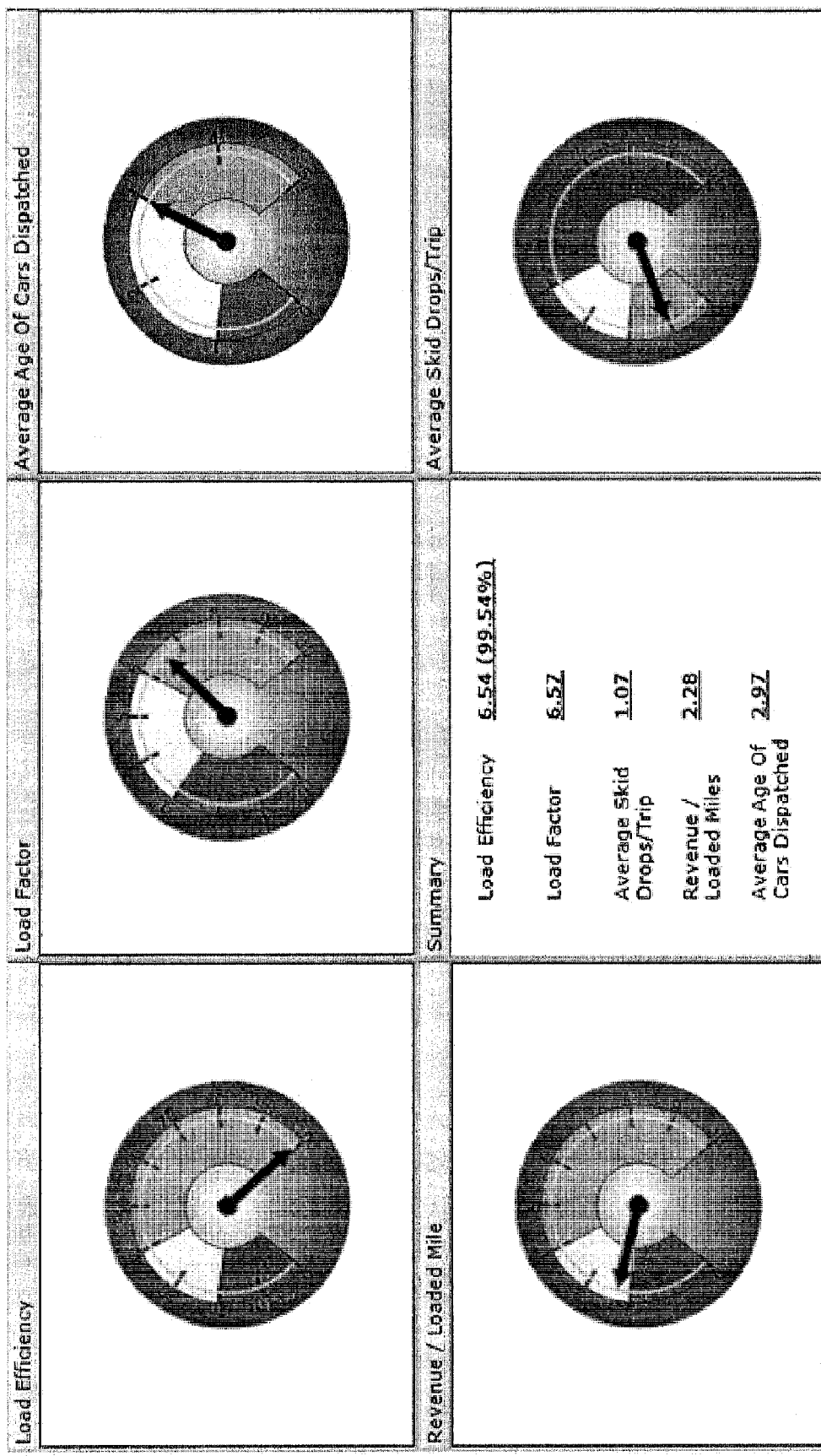
FIG. 5 is a sample dashboard user interface in a vehicle load optimization system in accordance with an exemplary embodiment.

Certain metrics of the best profile set of loads are displayed on a GUI upon selection of the dashboard tab 302, and the best profile set of loads is displayed on a GUI upon selection of the solution set tab 310 in an operation 465. FIG. 5 depicts a screen shot of a GUI after the selection of the dashboard tab 302. The GUI depicts graphical representations of the load efficiency, the load factor, the average age of cars dispatched, the revenue per loaded mile, and the average skid drops per trip. The graphical representations are in the form of gauges. The gauges have threshold values which are illustrated by green to represent good values, yellow to represent neutral values, and red to represent bad values. In addition, the GUI depicts a summary of the metrics.

Selection of the solution set tab 310 displays a GUI the solution set at the load level and may include the following data elements: load number, origin location, destination location, number of cars in load, skid drops, revenue miles, revenue, load efficiency, and revenue/loaded mile.

FIG. 9 depicts a screen shot of a GUI after the solution set tab has been chosen. The solution set tab also enables a secondary display to view details of individual loads which may contain the order number, origin 104, destination 106, VIN 102, released date 112, date out, vehicle type, make, model, revenue 114, revenue miles, loaded miles, and must ship flag 116. In addition, the user may manually delete a selected vehicle from a load and add a vehicle from inventory 10 which is not part of the current best profile set of loads.

If the user is not satisfied with the current best profile set of loads, the user may reconfigure the parameters of the load optimizer in an operation 440 and re-run the optimization. Once the user is satisfied with the best profile set of loads, the user will select the "commit" function in an operation 480 within the solution set tab 310. A visual confirmation mechanism is provided to ensure the user wants to commit to the current best profile set of loads. Upon confirmation, in an operation 490, the best profile set of loads will be exported to the dispatch and the transports are loaded according to the profile. Possible export methodologies include web services, file export, or direct database update.

By way of example, in an exemplary implementation using computer software, a delivery distance is determined for all vehicles in inventory from an origin ZIP code to a destination ZIP code. An example inventory table is shown below.

| VIN | Origin Zip | Dest. Zip | Dest. Client | Distance | Size | Released | Revenue | Must Ship |
|---|---|---|---|---|---|---|---|---|
| 212211222 | 12345 | 23456 | 11 | 65 | 3 | Feb. 10, 2006 15:00 | $315.00 | False |
| 655144244 | 12345 | 23222 | 14 | 120 | 1 | Feb. 7, 2006 8:00 | $230.00 | False |
| 345222245 | 12345 | 23222 | 14 | 120 | 2 | Feb. 10, 2006 12:00 | $264.00 | False |

A set of inventory objects is found by running a call multiple times with varying parameters. Examples of such parameters include quantity of inventory desired (numeric); load distance type (the types include city (less than 100 miles), mini (100-250 miles), turn (250-350 miles), and line (greater than 350 miles)); flag for inclusion of must ship vehicles; flag for inclusion of non-must ship vehicles; flag to include other vehicles going to same destination; must ship destination codes (if applicable); and flag to determine whether other destinations are allowed. The inventory candidates are prioritized, for example, by must ship first, then release data vulnerability, etc. For each candidate set, profile candidates are found by transport type and candidate set to determine the set's load factor, number of skid drops, revenue per mile, running miles, and which inventory items fit (or do not fit) into a load. The set of candidates with the best profile is chosen, e.g., using the Best Fit Matrix in the table shown below. Then a load is created for the set with the best profile.

| Transport | Vehicle Size | | | | |
|---|---|---|---|---|---|
| Type | 1 | 2 | 3 | 4 | 5 |
| A | 10 | 0 | 0 | 0 | 0 |
| A | 7 | 0 | 1 | 1 | 0 |
| A | 9 | 1 | 0 | 0 | 0 |
| B | 10 | 0 | 0 | 0 | 0 |
| B | 9 | 1 | 0 | 0 | 0 |

A sample computer program product to implement the optimization method can include programming logic which determines delivery distance for all vehicles in inventory. Once a delivery distance is determined, the computer program product cycles through requested loads and, for each load, a software routine or method is called multiple times with varying parameters. This method provides a list of inventory objects based on requested parameters. Parameters can include: quantity of inventory desired, load distance type (city, mini, etc.), flag for inclusion of must ship vehicles, flag for inclusion of non-must ship vehicles, flag to include other vehicles going to same destination, must ship destination codes (if applicable), flag to determine whether other destinations are allowed. Inventory candidates can be returned in priority order (must ship, release date vulnerability, same destination, other destinations).

Another routine or method can be used, for each set of candidates, to determine that set's load factor, number of skid drops, revenue per mile, running miles, and which inventory items fit or do not fit in a load. The set of candidates with the best profile can be selected and a load for the set of candidates with the best profile can be created.

One or more flow diagrams have been used to describe exemplary embodiments. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for producing an optimized vehicle transport load comprising:
    an inventory of vehicles;
    a plurality of transportation devices;
    a load optimizer comprising input and output means, wherein said load optimizer is configured to produce a preferred distribution of said inventory of vehicles onto said plurality of transportation devices, wherein said preferred method of distributing said inventory vehicles onto said plurality of transportation devices is based on a user-defined best fit table, and wherein the user-defined best fit table comprises a plurality of preferred user-defined distributions of vehicles onto one or more specific types of transportation devices.

2. The system of claim 1, wherein information about said inventory of vehicles and information about said plurality of transportation devices is inputted into said load optimizer.

3. The system of claim 2, wherein said load optimizer utilizes a set of pre-defined rules when comparing said information about said inventory of vehicles and said plurality of transportation devices.

4. The system of claim 1, wherein said load optimizer further comprises configurable parameters to refine the production of said preferred method.

5. The system of claim 1, wherein said load optimizer further comprises displays for communicating said preferred method and metrics of said preferred method to a user of said load optimizer.

6. The system of claim 5, wherein said displays comprise graphical user interfaces.

7. The system of claim 1, further comprising a dispatch system, wherein said preferred method is communicated from said load optimizer to a dispatch system.

8. The system of claim 1, wherein the load optimizer is further configured to receive a best fit table input from a user, wherein the best fit table input specifies a quantity of vehicles that fit onto the one or more specific types of transportation devices.

9. The system of claim 1, wherein said load optimizer is configured to select one of the plurality of preferred user-defined distributions of vehicles from the user-defined best fit table and configure the best profile load according to the selected, preferred user-defined distribution of vehicles.

10. A non-transitory computer-readable medium with programmed instructions for optimizing vehicle load transports, the instructions comprising:
    instructions for importing a first set of data regarding an inventory, said inventory comprising a plurality of vehicles;
    instructions for importing a second set of data regarding a plurality of transportation devices; and
    instructions for creating a best profile load that illustrates a preferred distribution of said inventory onto said plurality of transportation devices, said best profile load based on said first set of data regarding said inventory and said second set of data regarding said plurality of transportation devices, wherein said best profile load is further based on a user-defined best fit table, and wherein the user-defined best fit table comprises a plurality of preferred user-defined distributions of vehicles onto one or more specific types of transportation devices.

11. The non-transitory computer-readable medium of claim 10, further comprising instructions for configuring prioritization parameters to organize said plurality of vehicles and creating said best profile load further based on said prioritization parameters.

12. The non-transitory computer-readable medium of claim 10, further comprising instructions for displaying said preferred method and metrics of said preferred method.

13. The non-transitory computer-readable medium of claim 10, further comprising instructions for communicating said preferred method to a dispatch system.

14. The non-transitory computer-readable medium of claim 10, further comprising instructions for deleting vehicles from said preferred method and adding vehicles to said preferred method from said inventory based on inputs received from a user.

15. The non-transitory computer-readable medium of claim 10, wherein said instructions for creating a best profile load comprise instructions for utilizing a set of pre-defined rules to compare the first set of data to the second set of data.

16. The non-transitory computer-readable medium of claim 10, further comprising instructions for receiving a best fit table input from a user, wherein the best fit table input specifies a quantity of vehicles that fit onto the one or more specific types of transportation devices.

17. The non-transitory computer-readable medium of claim 10, wherein the instructions for creating a best profile load comprise instructions for selecting one of the plurality of preferred user-defined distributions of vehicles from the user-defined best fit table and instructions for configuring the best profile load according to the selected, preferred user-defined distribution of vehicles.

* * * * *